United States Patent [19]

Morse

[11] 4,090,313
[45] May 23, 1978

[54] MANUALLY ASSEMBLABLE SLIDE CHART WITH INTEGRAL SELF-LOCKING TAB

[76] Inventor: Henry Clifton Morse, 345 Fullerton Pkwy., Chicago, Ill. 60614

[21] Appl. No.: 758,196

[22] Filed: Jan. 10, 1977

[51] Int. Cl.$^2$ .............................................. G09B 1/28
[52] U.S. Cl. ........................................... 35/75; 40/491
[58] Field of Search ............... 35/31 E, 74, 75; 40/65, 40/70 R; 46/1 L, 11

[56] References Cited

U.S. PATENT DOCUMENTS

| | | | |
|---|---|---|---|
| 1,902,121 | 3/1933 | Gallagher | 40/65 |
| 2,603,410 | 7/1952 | True et al. | 229/92.1 |
| 2,687,060 | 8/1954 | Scheb | 35/75 X |
| 3,013,349 | 12/1961 | Cooper | 35/75 |
| 3,103,080 | 9/1963 | Desmond | 40/70 R |
| 3,902,656 | 9/1975 | Rothschild | 229/75 |

Primary Examiner—Harland S. Skogquist
Attorney, Agent, or Firm—Hill, Gross, Simpson, Van Santen, Steadman, Chiara & Simpson

[57] ABSTRACT

A slide chart made from an elongated card and particularly adapted to be self-assembled for use as a calorie counter for food products, such as soft drinks, cereal products and the like. The card may be inserted in a carton or other container for food products in its elongated form and may be assembled by the purchaser into a slide chart to give the calorie content of selected food products listed on opposite sides of the slide chart along opposite sides of slots on opposite sides of the chart. The elongated card has a locking tab at one end and a slide card separable from its opposite end.

2 Claims, 5 Drawing Figures

U.S.Patent  May 23, 1978  4,090,313

MANUALLY ASSEMBLABLE SLIDE CHART WITH INTEGRAL SELF-LOCKING TAB

PRIOR ART

The U.S. Pat. Nos. to Rothchild 3,902,656 and True et al 2,603,410 show slide charts or mailing pieces which are folded to form the chart or mailer, but which are of a relatively complicated construction and are supplied in their completed forms. Copies of these patents are provided with this application and it is requested that they be made of record.

SUMMARY AND ADVANTAGES OF INVENTION

The device of the present invention differs from the prior art devices of which applicant is aware in that it is supplied in the form of an elongated card which may be inserted in a carton containing soft drinks or in various other packages for food products and may be assembled by the purchaser of the food products to give the calorie count of certain foods as selected by the purchaser. The slide card is separable from the elongated card and the elongated card is folded over by folding one section over the other section and then locking the two sections in the form of a slide by the use of a pre-formed lock at one end of the elongated card and fitting into a slit over which a first section of the card is folded. The first and second sections of the card have windows registrable with markers on each side of the slide card, and have indicia on each side of said transverse slit indicating certain foods which may determine the calorie count of certain of selected foods. The first and second sections also have transverse slots extending therethrough registrable with indicia on opposite sides of the slide card which may designate the calorie count of a selected food or drink on either the front or back of the chart and along which the marker may be positioned. The transverse slots on the first and second sections are misaligned to assure that the slide card be placed in the proper position in the slide.

One of the advantages of the present invention is that the slide chart is in the form of a single flat card which may readily fit into a container for bottles or packages for food products and then be assembled by the purchaser to provide, in effect, a do-it-yourself slide chart in which gluing and grommets are unnecessary.

A further advantage of the invention is in the simplified arrangement of the flat elongated card, which is so arranged that the card may be assembled into a computer-type slide chart by the average individual and the slide card cannot be improperly placed in the slide.

A still further object and advantage of the invention is that the self-assembled slide chart is of a rugged construction and may be indefinitely used by the purchaser of the food products.

Other objects, features and advantages of the invention will be readily apparent from the following description of the preferred embodiment thereof, taken in conjunction with the accompanying drawings, although variations and modifications may be effected without departing from the spirit and scope of the novel concepts of the disclosure.

DESCRIPTION OF PREFERRED EMBODIMENT

Figure 1:
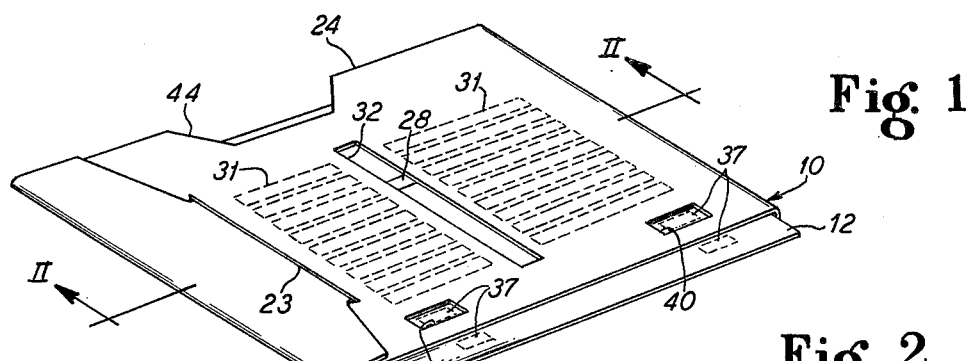
FIG. 1 is a view of the assembled slide chart showing the slide in an operative position.
Figure 2:
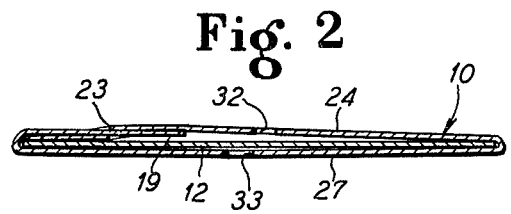
FIG. 2 is a sectional view taken substantially along line II—II of FIG. 1.

In the embodiment of the invention illustrated in FIGS. 1 and 2 of the drawings, I have shown an assembled slide chart 10 comstructed in accordance with the principles of the present invention and including a slide 11 for a slide card 12, formed by the simple folding of one part of an elongated card over the other along designated fold lines, and the folding of a locking tab 19 over one of the parts and inserting the locking tab 19 through a slit 23, to permanently lock the slide in the condition shown in FIGS. 1 and 2 without the use of glue or grommets.

Figure 3:
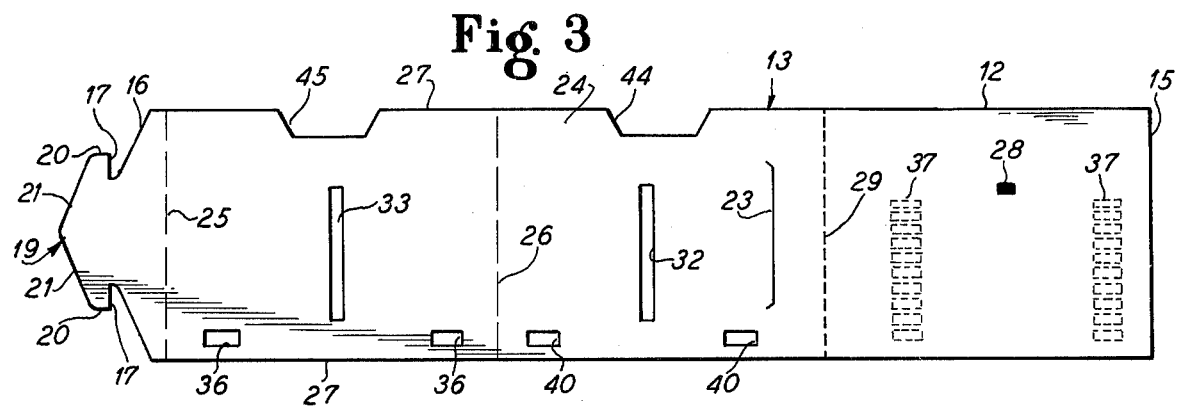
FIG. 3 is a view of the back side of the card as supplied and placed in a container for foods.
Figure 4:
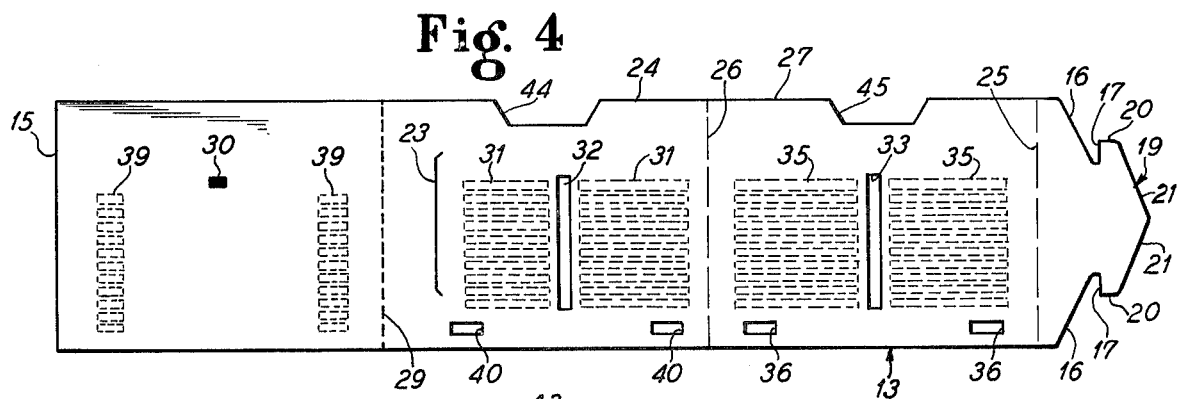
FIG. 4 is a view of the front side of the card shown in FIG. 3.

The slide 11 and card 12, and locking means therefor, are supplied in the form of an elongated card 13, as shown in FIGS. 3 and 4. The elongated card 13 has parallel side walls, one end wall 15 perpendicular to the side walls thereof and an opposite end wall having a tapered portion 16 formed by ends tapering at equal angles with respect to each other and with respect to the center line of the card and terminating into shoulders 17 defining the inner ends of a locking tab 19. The locking tab 19 is formed from parallel sides 20 extending outwardly from said shoulders and terminating into tapered ends 21, 21 terminating at the apex of the locking tab to enable the tab to readily be inserted in a slit 23 in a section 24 of the slide chart.

The card 13 has a fold line 25 spaced inwardly of the tapered sides 16, and about which the locking tab 19 is folded for insertion in a slit 23 in a section 24 of the slide chart.

The card 13 also has a fold line 26 defining the end of a section 27 of the slide chart and about which the section 24 is folded over the section 27 of the slide chart.

A score line 29 defines what will be a free end of the section 24 of the slide chart when the slide is separated from the card.

The slide card 12 has a central marker 28 on one side thereof and has a similar marker 30 on the opposite side thereof. The marker 28 may be moved along the assembled slide chart along a transverse slot 32 upon movement of the slide card 13 along the slide formed by the folded over sections 24 and 27. The indicia are on opposite sides of the transverse slot 32 and are shown as being in rows or columns.

As shown in FIG. 4, the indicia 31 are on the side of the section 24 of the slide chart which will be its outer side when the chart is assembled.

The section 27 also has a transverse slot 33 extending therealong. Indicia 35 are on each side of said slot on the side of the section 27 which will be its outer side when the slide chart is assembled. The slot 33 is out of registry with the slot 32 when the section 24 is folded over the section 27, to assure the slide card will be in the proper position to correspond to the indicia 31 and 35 when the slide chart is assembled.

The section 27 also has windows 36 beneath the columns of indicia 35 and registrable with indicia 39 on one side of the slide card 12 and designating the calorie count of a food or drink along which the marker 30 on the slide card 12 is placed.

The markers 28 and 30 are positioned to be in alignment with the respective slots 32 and 33 when the slide card is properly positioned in the slide. Each window 36 is beneath a row or column of indicia 31 and enables the calorie count in the row thereabove to be determined. The side of the card 12 having the marker 30 thereon and having rows of indicia 39 on each side of said marker registrable with the windows 36 designates the calorie count of a certain selected food in a row 35 on either side of the slot 33 through either window 36 as selected.

The calorie count of a selected food in either row 31 is visible through windows 40 beneath each row or column 31 of indicia in accordance with the position of the slide card along the slide chart.

Figure 5:
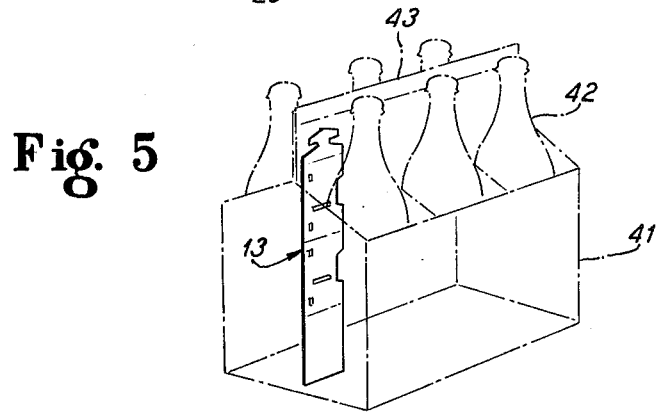
FIG. 5 is a diagrammatic view illustrating a carrier for bottled goods, with the slide card in an upright position therein to be readily seen by the purchaser and removed for assembly.

In FIG. 5, a carrier or container 41 for bottles 42 containing a beverage is shown in phantom. The container 41 may be a standard form of container or may be a container for cans where the beverage is sold in cans.

With the container shown in FIG. 5, the card 13, suitably printed on each side thereof, in its elongated form may be placed in the container behind a bottle adjacent a handle 43 for the container or carrier. Where the beverage is dispensed in cans, or where the bottles are shorter than standard size beverage bottles, the card 13 may be reduced in length with the sections 24, 27 and the slide card 12 similarly reduced.

In assembling the slide chart, the slide card 12 is first detached along the score line 29. The section 24 may then be folded over the section 27 along the fold line 26. The locking tab 19 may be folded along the fold line 25 and inserted in the slit 23 in the section 24. This will firmly lock the sections 24 and 27 to form a slide for the card 12. The slide card 12 may be inserted in the slide to the full width of the card. Access may be had to the slide card 12 through thumb notches 44 and 45 in the sections 24 and 27 respectively, as shown in FIGS. 1, 3 and 4. The notches 44 and 45 are sufficiently deep and wide to enable the thumb or fingers to firmly grasp or slide the card along the slide until the end of the slide card 12 projects from the opposite side of the slide chart from the thumb notches 44 and 45. The end of the card may then be grasped by the fingers to slide the card to register the markers 28 or 30 with the respective indicia 31 or 35 on the respective sections 24 and 27. The calorie count from one side or the other of the slide chart may thus be ascertained as selected.

A glueless and grommetless slide chart has thus been provided in which the slide is locked in position by a locking tab providing a rigid and permanent lock an in which the slide card is a part of the elongated card and may be readily separable along score lines for insertion in the slide formed by the sections 24 and 27 of the slide chart.

It should be understood that while the slide chart is described as a calorie counter, it need not necessarily be a calorie counter, but may be used for various other purposes, such as the designation of sports records or any other records desired.

I claim as my invention:

1. For use as a calorie counter, an elongated card adapted to be supplied in strip form with soft drinks, packages of food products and the like and to be assembled by the purchaser into a slide chart to be used to count the calories of the product with which the card is supplied, said elongated card being divided into four sections, a first section being in the form of a pre-formed lock characterized by a tapered portion tapering inwardly from the sides of the card at equal angles with respect to each other and with respect to the center line of the card and terminating into laterally outwardly extending shoulders, said shoulders terminating into parallel sides extending longitudinally outwardly from said shoulders equal distances and terminating into tapered ends converging to an apex and forming the apex of said pre-formed lock, a third section of the card having a transverse slit through which the pre-formed lock may be inserted, a transverse fold line extending across said card inwardly of the tapered sides thereof and about which the pre-formed lock may be folded for locking a second section of the card in folded relation over a third section of the card to form a slide, a fourth section of the card forming a slide card and defined at its inner end by a score line extending across the third section and along which the slide card may be manually detached from the card, said slide card having a generally central marker on each side thereof, one marker being longitudinally displaced relative to the other, and the second and third sections of the card forming a slide having transverse slots extending thereacross, longitudinally displaced with respect to each other when one section is folded over the other and each being in alignment with a marker on an adjacent side of the slide card when in place in the slide, rendering it necessary to place the slide card in the proper position in the slide to enable said markers to be viewed through said slots on each side of the slide.

2. The calorie counter of claim 1 wherein certain indicia are on each side of said transverse slots in rows in said second and third sections and extending transversely of the card, to register with a selected marker, wherein calorie-indicating indicia are on each side of said markers on said slide card and cooperate with said markers on said slide card as placed adjacent a selected indicia on either side of the slide, and windows are provided in said first and second sections of the slide card, beneath said rows of indicia and on opposite sides of said transverse slots and designating the calorie count of a soft drink, a selected food product and the like in said rows of indicia and along which a selected marker of the slide card is placed.

* * * * *